Patented Apr. 17, 1923.

1,452,445

UNITED STATES PATENT OFFICE.

LÉON SEIDEMAN, OF NEW YORK, N. Y.

SILICATE COMPOSITION.

No Drawing.     Application filed June 2, 1920.  Serial No. 386,059.

*To all whom it may concern:*

Be it known that I, LÉON SEIDEMAN, a citizen of the United States, and a resident of the city of New York, borough of Manhattan, in the county and State of New York, have invented a new and Improved Silicate Composition, of which the following is a full, clear, and exact description.

This invention relates to silicate compositions, and has reference more particularly to a composition containing silicate and an oily substance, said composition being adapted to serve as a bronzing or other metallic paint liquid or vehicle, as a leather dressing or as a substitute for varnish and shellac.

An object of this invention, therefore, is to provide a silicate composition of the class indicated which is incombustible, inodorous, dries quickly with a brilliant gloss, and mixes well with bronze powder, inks, dyes, or other substances.

Another object of this invention is to provide a composition which may be used as a substitute for varnish and shellac.

A further object of this invention is to provide bronzing liquid which will maintain the color of the bronze without causing same to darken.

My composition consists essentially of a mixture of sodium silicate or other silicates with a substance such as glycerine, corn oil, etc. Sodium silicate is usually sold commercially at a density of 40° Bé. and I find that a density of 20° Bé. is most desirable for use as a bronzing liquid. To one fluid ounce of water, I add three grams of an oily substance such as glycerine, and this glycerine solution is then added to one fluid ounce of 40° Bé. sodium silicate. The resulting composition will readily mix with bronze powder and will quickly dry after application to the substance to be bronzed. The glycerine greatly assists in causing the sodium silicate to mix with the bronze powder and also increases the spreading power of the bronzing liquid. The glycerine or other oily substance also serves to conceal the particles of sodium carbonate formed by the action of the carbon dioxide in the air on the sodium silicate since these particles would otherwise give a white, objectionable, dusty appearance to the bronzed articles after the bronzing liquid has dried. My bronzing metallic paint containing the bronze powder, the sodium silicate, and the glycerine, does not darken in color as it dries on the article, as frequently occurs with other bronzing compositions, but my composition will dry to a slightly lighter color which is more desirable. My silicate composition can also be used for the application of other metallic powders such as silver, gold, aluminum, etc.

This bronzing liquid has many advantages in that it is incombustible and renders the article to which it is applied incombustible, is inodorous, flows freely, and is very quick-drying. With my improved liquid, it is possible to apply bronze, gold, silver, aluminum or other metallic powders to glass, porcelain or other ceramic products without firing which would be otherwise necessary, since the sodium silicate combines chemically with the glass. The glycerine may be omitted by sacrificing some of the good qualities of my bronzing composition, and when the composition is used as a leather dressing, the glycerine is preferably omitted. I have found that the 20° Bé. sodium silicate solution mixes readily with ink, dyes, etc., and the resulting mixture produces a leather dressing which gives a very smooth and serviceable gloss, and after said dressing is worn off, the leather remains soft and smooth. This leather dressing also dries quickly, is inodorous, and renders the leather incombustible.

I have also found that the sodium silicate mixed with an oily substance such as corn oil, is a very desirable substitute for varnish and shellac since it spreads easily, gives a very hard surface with a high gloss equal to that of glass, and renders the articles which are coated with my composition incombustible. For use as a varnish and shellac substitute, I prefer mixing one drop of corn oil or other oily substance with one ounce of 40° Bé. sodium silicate or other silicate.

I would state in conclusion that while the examples described represent a practical embodiment of my invention, I do not limit myself precisely to the details herein described since manifestly same can be considerably varied without departing from the spirit of the invention as defined in the appended claims.

Having thus described my invention, I claim as new and desire to secure by Letters Patent:

1. A composition of matter, which comprises one fluid ounce of sodium silicate having a density of 40° Bé., and one drop of corn oil.

2. A metallic paint composition which consists of a water-soluble silicate, a vegetable oil, and a metallic powder.

LÉON SEIDEMAN.